United States Patent [19]

Yoshikawa et al.

[11] 4,161,562
[45] Jul. 17, 1979

[54] BIAXIALLY STRETCHED FIVE-LAYER FILM FOR PACKAGING FOOD

[75] Inventors: Shinsuke Yoshikawa; Nobuyuki Hisazumi; Masataka Yamamoto, all of Iwaki, Japan

[73] Assignee: Kureha Kagaku Kogyo Kabushiki Kaisha, Tokyo, Japan

[21] Appl. No.: 862,135

[22] Filed: Dec. 19, 1977

[30] Foreign Application Priority Data

Dec. 29, 1976 [JP] Japan .................................. 51-159068

[51] Int. Cl.² .............................................. B32B 7/02
[52] U.S. Cl. ..................................... 428/215; 428/518; 428/520; 428/910; 428/421; 428/422; 156/245; 426/127
[58] Field of Search ............... 428/910, 215, 518, 520, 428/421, 422

[56] References Cited

U.S. PATENT DOCUMENTS

| | | | |
|---|---|---|---|
| 3,908,070 | 9/1975 | Marzolf | 428/518 |
| 3,932,692 | 1/1976 | Hirata et al. | 428/520 |
| 4,008,352 | 2/1977 | Dawes et al. | 428/518 |

FOREIGN PATENT DOCUMENTS

982923 2/1976 Canada.

OTHER PUBLICATIONS

Japan, Pat. Appln. #51-93976, Aug. 18, 1976, Kaisha.

*Primary Examiner*—P. C. Ives
*Attorney, Agent, or Firm*—Stevens, Davis, Miller & Mosher

[57] ABSTRACT

A biaxially stretched five-layer film suitable for packaging fatty foodstuffs of irregular shape is disclosed, which has a first (outermost) layer made of an ionomer, an olefin homopolymer, an olefin copolymer or a mixture of the olefin homopolymer with the olefin copolymer, a second layer of an ethylene copolymer, a third layer of a vinylidene copolymer, a fourth layer of an ethylene copolymer and a fifth (innermost) layer of an ionomer. This film is obtained by preparing a laminate consisting of the layers of respective resins mentioned above by means of a specific die designed for multilayer tubular molding and biaxially stretching the laminate under specific conditions.

8 Claims, 2 Drawing Figures

FIG. 1

BIAXIALLY STRETCHED FIVE-LAYER FILM FOR PACKAGING FOOD

FIELD OF THE INVENTION

This invention relates to a biaxially stretched five-layer film suitable for packaging fatty foodstuffs of irregular shape and to a method for the manufacture thereof.

BACKGROUND OF THE INVENTION

Generally, fatty foodstuffs such as raw meat, processed meat and cheese are irregular in shape and are more often than not sold in a boned form or in a form accompanied by various accessorial articles (primary packaging materials such as, for example, plate and net).

In the packaging of these fatty foodstuffs of irregular shape, there has heretofore been used the so-called shrinkpackaging method which includes wrapping the foodstuffs with shrinkable films. This method proves most convenient for the purpose. In this respect, vinylidene chloride copolymer resins (hereinafter referred to as "VDC resins" for short) excel in gas-impermeability, oil resistance and sealing with wire clips as well as in shinkability and, for this reason, find widespread acceptance for use in shrinkable films.

The VDC resins which are in use today contain from 6 to 10% by weight of additives such as plasticisers and stabilizers which have been incorporated therein for the purpose of imparting the flexibility necessary for enhancing cold resistance and the ability to seal with clips; and further for the purpose of conferring an advantageous film-forming property. Use of VDC resins, therefore, can at times result in a hygienically undesirable situation where the additives present in the resins migrate into some, if not all, foodstuffs which are exposed to direct contact with the resin films. It may also happen that the resins, if used on heavy foodstuffs, fail to provide sufficient physical strength, especially cold resistance.

Various attempts have heretofore been made to cure the VDC resins of such disadvantages. For example, there has been suggested a three-layer laminate film which is produced by interposing a layer of a VDC resin between a pair of outer layers each made of an ethylene-vinyl acetate copolymer resin (hereinafter referred to as "Et-VA resin" for short) excelling in cold resistance property and adhesiveness with VDC resins and subsequently causing the three layers to be simultaneously coextruded as a single construction (as disclosed in Canadian Pat. No. 982,923, for example). There has also been suggested a three-layer laminate film of a similar construction, differing in the cross-linking of one of the outer Et-VA resin layers (one of the two outer layers of the laminate film) by exposure to radiant rays (as disclosed in Japanese Patent Laid-Open Publication No. 34565/1972, for example). These conventional multi-layer laminate films invariably have at least one of the outer layers made of an Et-VA resin which is notably deficient in oil resistance property (namely, the outer layer of Et-VA resin is not cross-linked by exposure to radiant rays). In the packaging of fatty foodstuffs by use of these films, if the films are used in such a manner that their non-crosslinked outer layers fall on the outermost side, then such outer layers are inevitably susceptible to adhesion of fats or oils in the course of the packaging process. The innermost layers of these laminate films which are exposed to direct contact with foodstuffs, therefore, are required to possess an oil resisting property where the foodstuffs are of a fatty nature. This means that in those multi-layer laminate films which are used for packaging fatty foodstuffs, the outermost layers and innermost layers are both required to possess an oil resisting property. The fatty foodstuffs thus wrapped in such multi-layer laminate films are dipped in a hot water bath kept about 95° C. so as to shrink the laminate films. During this shrinking process, the outermost layers of the laminate films are severly tested with respect to resistance. The outermost layers are, accordingly, required to have sufficient resistance to both heat and oil at such elevated temperatures. In this respect, the multilayer laminate films produced by the conventional techniques described above are not completely satisfactory.

Prior to the shrinking process, the fatty foodstuffs of irregular shape are wrapped in multi-layer laminate films, evacuated to a vacuum and clipped at opposite open ends with wire clips. As the result, a vacuum occurs and remains between the films and the foodstuffs where the packaged articles contain voids. During the shrinking process, portions of the films adjacent voids are exposed to the stress of thermal shrinkage and to the external pressure due to the presence of a vacuum and, furthermore, are softened by the action of heat and oil. Such affected portions of the films are inevitably stretched to an excessively small thickness, with the result that the permeability and strength are degraded possibly to the extent of causing the most serious problem of rupture. What is more, the multi-layer laminate films produced by the conventional techniques invariably have their seams heat sealed and, therefore, have not been completely freed from the problem that their sealed layers, upon exposure to an intense heat of 95° C. and in the presence of an oil, are swelled with the oil and are consequently degraded in strength, occasionally to the extent of sustaining rupture along the seams.

SUMMARY OF THE INVENTION

It is, therefore, an object of the present invention to provide a multi-layer laminate film which satisfies all the requirements of gas-impermeability, cold resistance, ability to be sealed by wire clips and by heat; and thermal shrinkability and also to provide a method for the manufacture of such a film.

This and the other objects of the present invention will become apparent from a perusal of the description to follow.

We have now discovered that a specific biaxially stretched five-layer laminate film having a first (outermost) layer made of an ionomer, an olefin homopolymer, an olefin copolymer, or a mixture of the olefin homopolymer with the olefin copolymer, a second layer of an ethylene copolymer, a third layer of a vinylidene chloride copolymer, a fourth layer of an ethylene copolymer and a fifth (innermost) layer of an ionomer is suitable for packaging of fatty foodstuffs. We have also learned that a film desirable for the purpose is obtained by preparing a laminate consisting of the layers of respective resins mentioned above by use of a specific die designed for multilayer tubular molding and subsequently biaxially stretching the laminate under specific conditions.

According to the present invention, there is provided a biaxially stretched five-layer laminate film wherein the first layer is made of an ionomer, an olefin homopolymer, an olefin copolymer or a mixture of the olefin homopolymer with the olefin copolymer to a thickness in the range of from 7 to 25μ, the second layer made of an ethylene copolymer with a crystal-melting temperature 5° to 30° C. lower than that of the ionomer to a thickness in the range of from 0.2 to 3μ, the third layer made of a vinylidene chloride copolymer to a thickness in the range of from 5 to 15μ, the fourth layer made of an ethylene copolymer with a crystal-melting temperature 5° to 30° C. lower than that of the ionomer to a thickness in the range of from 0.2 to 3μ, and the fifth layer made of an ionomer to a thickness in the range of from 20 to 50μ, the ratio of the thickness of the first layer to that of the fifth layer falls in the range of from 0.4 to 0.6 and the total thickness of the film is in the range of from 35 to 90μ. Further, according to the present invention, there is provided a method for the manufacture of a biaxially stretched five-layer film, which method includes (1) operating a three-layer tubular molding die having three resin flow paths, each of the resin flow paths having a torpedo serving to divide the flow of resin in the path, with the flow path for the outermost resin layer and that for the intermediate resin layer each having a main duct and a tubular duct merging into the main duct and terminating adjacent to but; not in contact with the torpedo, (2) feeding an ionomer, an olefin homopolymer, an olefin copolymer or a mixture of the olefin homopolymer with the olefin copolymer to the flow path for, the outermost layer feeding a vinylidene chloride copolymer to the flow path for the intermediate layer resin and feeding an ionomer to the flow path for the innermost layer resin and, at the same time, feeding an ethylene copolymer with a crystal-melting point 5° to 30° C. lower than that of the ionomer to each of the tubular paths, thereby producing a laminate, (3) suddenly cooling the resultant laminate thereby causing the vinylidene chloride copolymer present in the laminate to assume an amorphous state and (4) biaxially stretching the thus quenched laminate at a temperature which is lower than the crystal-melting point of the outermost layer resin and that of the innermost layer resin and at least 4° C. higher than the crystal-melting point of the ethylene copolymer.

DETAILED DESCRIPTION OF THE INVENTION

The VDC resin used as the third layer resin in the biaxially stretched five-layer laminate film of the present invention is a copolymer consisting of 65 to 95% by weight of vinylidene chloride and 5 to 35% by weight of at least one unsaturated monomer which is copolymerizable with the vinylidene chloride. Examples of copolymerizable monomers include vinyl chloride, acrylonitrile, alkyl acrylic esters (with alkyl groups having from 1 to 18 carbon atoms), etc. This VDC resin may contain small amounts of plasticizer and stabilizer as occasion demands. These additives are know to these skilled in the art and include dioctyl adipate and epoxydized soybean oil, which are, respectively, of a representative plasticizer and a stabilizer. In the present invention, this VDC resin layer serves to confer upon the produced film the gas-impermeability and durability to the shrinking treatment. The layers of the film other than this VDC resin layer have melting points approximating the temperature at which the shrinking treatment is carried out, so that their strengths are heavily degraded during the shrinking treatment and their inclination toward loss of strength becomes all the more conspicuous when they are plasticized by fats which adhere to the film when the film is put to practical use. If the VDC resin layer which possesses an oil resisting property and particularly heat resistance is excessively thin, then it fails to sufficiently withstand the stress of thermal shrinkage and even a slight degree of external impact results in rupture. For these reasons and particularly the latter reason, the VDC resin layer is required to have a thickness of at least 5μ, preferably of more than 7μ and this thickness must be increased with the increasing weight of a given article to be packaged with the film of the invention. If the thickness exceeds 15μ, however, the occurrence of cracks due to the low-temperature brittleness of the film can no longer be prevented even by virtue of the outermost (first) layer resin and the innermost (fifth) layer resin. Thus, the thickness of the VDC resin layer is limited to the range of from 5 to 15μ, preferably to the narrower range of from 7 to 12μ.

The ionomer used as the outermost (first) layer resin or the innermost (fifth) layer resin in the present invention is an ionic copolymer having an ionic linkage, which is produced by completely or partially neutralizing a copolymer of an α-olefin such as ethylene with an unsaturated organic acid such as acrylic acid or methacrylic acid into a salt with the cation of an alkali metal, zinc or the like. In the film of this invention, this ionomer is used for the purpose of stabilizing the stretching operation thereby giving rise to the required shrinkability and conferring upon the produced film the heat-sealing ability, cold resistance oil resistance and, particularly, seal strength in the presence of an oil. The innermost layer serves as the surface of the film for direct contact with foodstuffs to be packaged with the film. When the thickness of the innermost layer is less than 25μ, particularly 20μ, the film is deficient in seal strength. When the thickness exceeds 45μ, particularly 50μ, the film suffers from undesired rigidity, loss of flexibility and ability to be sealed by clipping. Because of such undesirable phenomena, the thickness of this layer is limited to the range of from 20 to 50μ, preferably to the narrower range of from 25 to 45μ.

The ionomer, olefin homopolymer, olefin copolymer or mixture of the olefin homopolymer with the olefin copolymer, which is used as the first (outermost) layer resin, is intended to protect the third layer of the VDC resin. In addition, it serves to impart to the produced film cold resistance, sufficient heat resistance at 95° C. and oil resistance in the presence of fats and, yet, does not adversely affect the film's stretchability by inflation. For this reason, the first layer resin is preferred to have a crystal-melting point which is at least 4° C. higher than the crystal-melting point of the second and fourth layer resin and at most 15° C., preferably at most 10° C., higher than that of the fifth (innermost) layer resin. The term "crystal-melting point" as used in the present description refers to the temperature at which the curve of crystal-melting temperatures measured with an 8-mg sample and a temperature increase of 8° C./min., as measured by a differential scanning calorimeter (Model 1B, made by Perkin-Elmer Corp.), reaches its peak. Examples of homopolymers or copolymers usable for the first layer resin include ethylene homopolymers, ionomers, ethylene-vinyl acetate copolymers having ethylene contents of not less than 96% by weight, ethylene-propylene copolymers having ethylene contents of not less than 96% by weight, and ethylene-acrylic ester copolymers having ethylene contents of not less than 96% by weight. Of these resins, particularly preferable are ionomers and ethylene homopolymers or copolymers having a density of not more than 0.925 g/cm³ and a melt index of from 0.3 to 1.0. The mixture of an olefin hompolymer with an olefin copolymer, which is usable as the first layer resin, is particularly preferred, for the purpose of further enhancing the ethylene homopolymer's stretchability by inflation and yet avoiding possible degradation of resist-oil resist-resistance, to be a mixture obtained by blending an ethylene homopolymer having a density of not more than 0.925 g/cm³ with an ethylene copolymer such as, for example, ethylene-vinyl acetate copolymer, ethylene-acrylic ester copolymer or ethylene-propylene copolymer. This mixture is used advantageously when its ethylene content is not less than 92% by weight, preferably more than 95% by weight, and more preferably more than 97% by weight. For the purpose of enabling the produced film to acquire an improved seal with the use of a wire clip and an enchanced ease of handling, the resin used as the first layer resin may incorporate a small amount of lubricent. With a view to the cold resistance of the film, the first layer is required to have a thickness of not less than 7μ, preferably 10μ. To avoid obstructing the stretchability of the film, however, this thickness is limited to a maximum of 25μ. To ensure good balance among the various properties desired, the ratio of the thickness of the first layer to that of the fifth layer is limited to the range of from 0.4 to 0.6.

A film consisting of only the three layers described above exhibits lower interlayer adhesive strength after the stretching treatment than before the treatment. In the case of a thermally shrinkable stretched film which consists of these three layers, therefore, selection of an adhesive agent used for fast interlayer adhesion and selection of a method for the interlayer adhesion itself prove quite significant. A possible reason is that the stretching operation performed on the film results in a decrease in the area of adhesion at the interfaces and that the orientation of molecules due to the stretching also serves to degrade the adhesive strength at the interfaces of the layers. Where the adhesive strength at the interfaces of the layers is deficient, the excellent synergistic effect of the oil resistance and heat resistance offered by the ionomer layer and the VDC layer is not advantageously manifested and the durability acquired fails to withstand the various stresses caused such as by thermal shrinkage, with the possibility that the film will rupture along the seal adjacent voids. After an elaborate investigation in search of a method for overcoming this problem, we have discovered that adhesive strength is particularly required at the interface between the ionomer resin layer and the adhesive layer and at the interface between the VDC resin layer and the adhesive layer. We have also ascertained that, as an ideal adhesive agent to be used for enhancing the adhesive strength at these interfaces, an ethylene copolymer is suitable where it has a crystal-melting point which is lower than that of the ionomer in use by a difference exceeding at least 5° C., preferably 7° C. and more preferably 11° C. but not exceeding 30° C., preferably 20° C. We have also learned that the temperature at which the film is stretched must be lower than both the crystal-melting point of the outermost (first) layer resin and that of the innermost (fifth) layer resin and, yet, at least 4° C. higher than the crystal-melting point of the ethylene copolymer. The crystal-melting point of the ethylene copolymer used as the adhesive agent must be limited to the aforementioned range, because the adhesive strength is seriously degraded after by the molecular orientation produced by the stretching operation when the temperature exceeds the upper limit and the adhesive strength at the interface between the ionomer layer and the adhesive layer of the ethylene copolymer is notably degraded when the temperature falls below the lower limit.

Secondly, it is imperative that the thickness of the VDC resin layer should be not less than 5μ as already pointed out.

Thirdly, it is important that the laminate should be subjected to stretching with the VDC resin layer retained in its amorphous state. The adhesion at the interface between the VDC resin layer and the adhesive layer can be fortified only when this requirement is satisfied.

Fourthly, it is necessary that the thickness of the adhesive layer should fall in the range of from 0.2 to 3μ, preferably in the range of from 0.5 to 1μ. In order for the thermal shrinkage of the film to be advantageously obtained in the presence of heat and oil, the thickness of the adhesive layer must be decreased to the greatest possible extent that does not result in degradation of the adhesive strength because the adhesive agent's lack of shrinkability adversely affects the overall shrinking property of the multi-layer laminate film and because the adhesive agent is deficient in oil resistance.

When an Et-VA resin is used as the adhesive agent, it is preferred to have an ethylene content in the range of from 70 to 92% by weight, preferably in the range of from 75 to 87% by weight and a melt index in the range of from 2 to 10 in order to fulfil all the requirements described above. Other examples of adhesive agents usable for this invention include a partially saponified Et-VA resin; products of grafting of Et-VA resin and/or this partially saponified Et-VA resin with various polar monomers such as acrylic acid, methacrylic acid, maleic acid, maleic anhydride and vinyl chloride; two-component copolymers of ethylene with acrylic esters, methacrylic esters, etc.; and three-component copolymers of ethylene with one of the esters and vinyl acetate. Although the preferable range for the ethylene content as one component of the adhesive agent varies with the degree of saponification, the rate of grafting and other similar factors, it may readily be determined by any person of ordinary skill in the art on the basis of the aforementioned description of the Et-VA resin. As is evident from the description given above, in the biaxially stretched five-layer laminate film of the present invention, the second and fourth layers serving as adhesive layers are made of an ethylene copolymer which has a crystal-melting point 5° to 30° C. lower than that of the ionomer used.

The total thickness of this biaxially stretched five-layer laminate film is limited to the range of from 35 to 90μ, preferably to the range of from 40 to 80μ, with due consideration to the strengths, handling property and economy of the film. Any deviation from this range may be detrimental. When the thickness is less than the lower limit 35μ, the film suffers from insufficient strength and frequently sustains rupture during its handling. Thus, the lower limit of the range may be higher depending on the weight of articles being packaged with the film in question. When the thickness exceeds the upper limit 90μ, the rigidity of the film may increase excessively even to the extent of defying all efforts made to fold the film in the clipping machine or the elasticity of the film may increase so much as to surpass the pressure with which the wire clip is tightened, with the result that the formed packages do not permit tight sealing.

In the manufacture of biaxially stretched multi-layer laminate films, no technique for simultaneously extruding a five layers of a laminate has ever been reduced to practical use because of the difficulty involved in the adjustment of interlayer thickness distribution. In a stretched film not so much as in an unstretched film, the adjustment of this interlayer thickness distribution must be controlled with high accuracy. This control is so difficult particularly in the case of a tubular film that those skilled in the art had resigned their hope of realizing this control as an impossibility. We have now succeeded making it possible to limit the thickness of the adhesive layer within the range of from 0.2 to 3μ, an indispensable requirement for the thermal shrinkage of the film to be successfully carried out in the presence of oil. Now, the method of the present invention for the manufacture of the biaxially stretched five-layer laminate film will be described in full detail with reference to the attached drawings.

Figure 1:
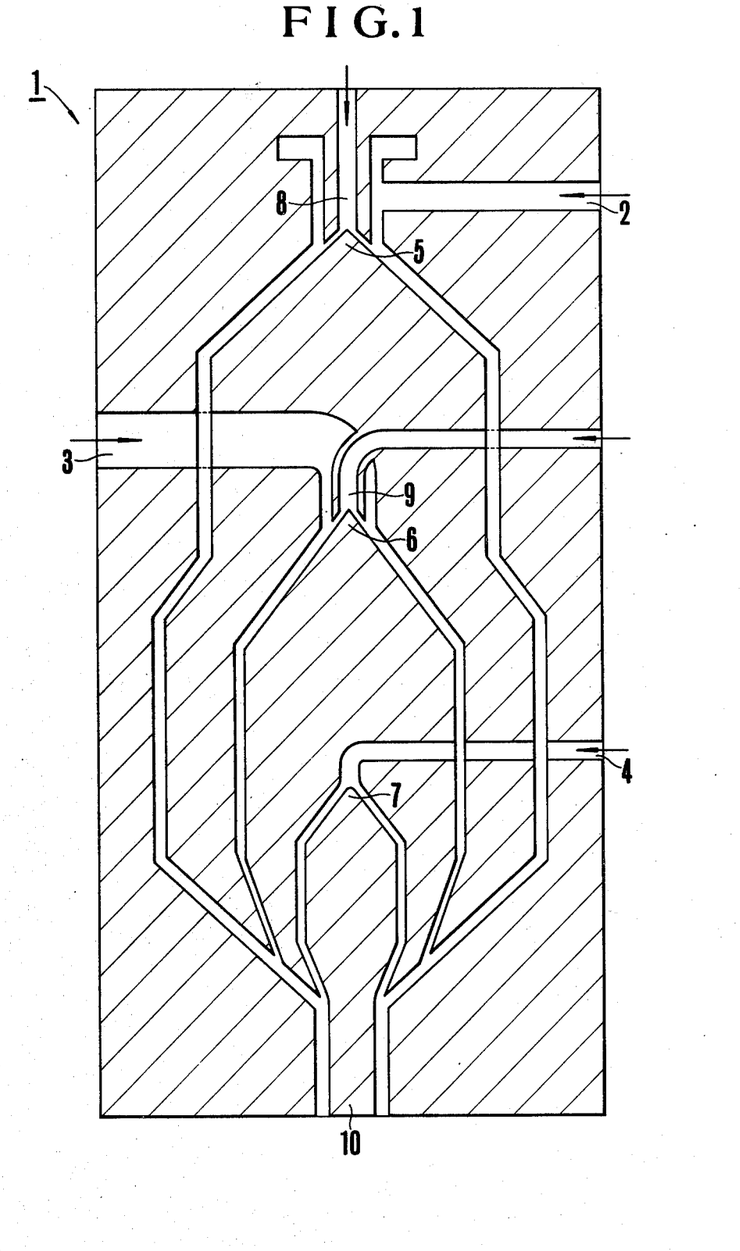
FIG. 1 is an explanatory diagram illustrating a typical case in which a laminate is molded by feeding the respective resins used as raw materials to the interior of a die in accordance with the present invention.

FIG. 1 is an explanatory diagram illustrating a typical case in which a laminate is molded by feeding the respective resins used as raw materials to the interior of a die in accordance with the present invention. In the diagram, 1 denotes a die to which the resins are fed in accordance with this invention. The die 1 is provided with resin flow paths 2, 3 and 4 and these resin flow paths are provided respectively with torpedoes 5, 6 and 7 each adapted to divide the flow of resin in the path. In this die 1, the flow path 2 for delivery of the outermost layer resin and the flow path 3 for delivery of the intermediate layer resin each consist of a main duct and a second tubular duct, 8 and 9, respectively, whose leading end extends coaxially into the interior of the main duct and terminates short of direct contact with the torpedoes 5 and 6. (It should be noted that no conventional die is provided with these tubular paths.) In the present invention, an ionomer, an olefin homopolymer, an olefin copolymer or a mixture of the olefin homopolymer with the olefin copolymer is fed through the flow path 2, a vinylidene chloride copolymer is fed through the flow path 3, an ionomer is fed through the flow path 4 and, at the same time, an ethylene copolymer having a crystal-melting point 5° to 30° C. lower than that of the ionomer is fed through the tubular paths 8 and 9. Consequently, a five-layer laminate is produced by extrusion through the lower portion 10 of the die 1. From the laminate thus extruded, a biaxially stretched five-layer laminate film is manufactured as illustrated in FIG. 2.

Figure 2:
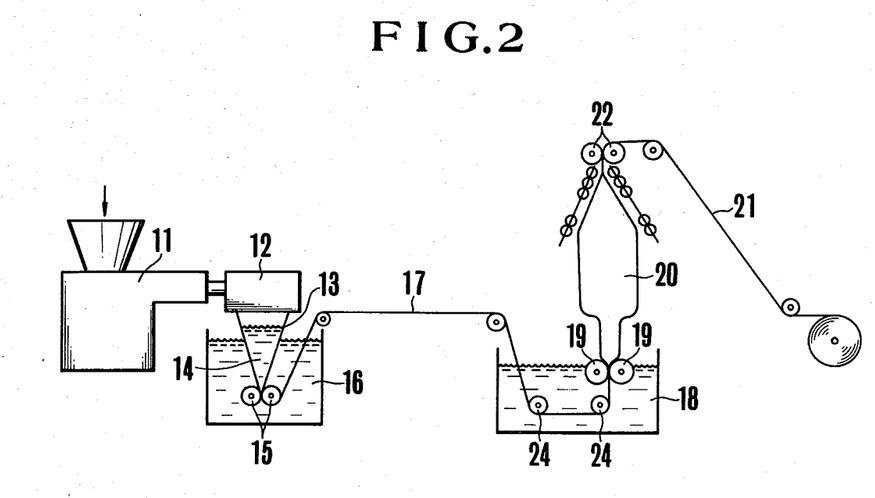
FIG. 2 is an explanatory diagram illustrating a typical case in which the laminate obtained as shown in FIG. 1 is converted into a biaxially stretched five-layer laminate film in accordance with the present invention.

In FIG. 2, 11 denotes an extruder and 12 a die (corresponding to the die 1 of FIG. 1). The resins extruded via the extruder 11 are sent through the die 12 and consequently extruded downwardly in the form of a five-layer tube 13. This tubular laminate 13 is cooled in a cooling tank 16 disposed directly below the die 12 and maintained at a temperature below 40° C. By means of a pair of nip rolls 15 disposed in the cooling tank 16, the liquid agent 14 placed inside the tubular laminate 13 for the purpose of preventing the unwanted adhesion between the opposed portions of the inner surface of the laminate is continuously squeezed out. The quenching received in the cooling tank 16 enables the adhesive layer and the VDC resin layer as well to retain their amorphous form. The tubular laminate 17 in this state is then passed around guide rollers 24 disposed in the lower portion of the hot water tank 18 kept at controlled temperatures of 85° to 95° C. and through a pair of nip rollers 19 disposed just below the surface of the hot water tank 18. Thereafter, while the tubular laminate is travelling between the nip rollers 19 and another pair of nip rollers 22 being rotated at a speed several times that of the nip rollers 19, it is cooled in the atmosphere at room temperature and simultaneously inflated with a continuously introduced flow of air forming a bubble, with the result that the tubular laminate is stretched by the biaxial inflation effected simultaneously circumferentially and lengthwise.

As the result of the operation described above, there is formed a shrinkable five-layer tubular film 21 of which the innermost layer and the outermost layer are biaxially oriented. This tubular film 21 may be cut open into a strip of sheet to suit the occasion.

In this operation, the temperature at which the stretching is effected must be lower than both the crystal-melting point of the outermost layer resin and that of the innermost layer resin and at least 4° C. higher than the crystal-melting point of the adhesive agent. The bubble stability is impaired when the temperature exceeds the upper limit, and the adhesive strength in the interface between the resin layers and the adhesive layer is degraded when the temperature falls below the lower limit.

As the liquid agent 14 used for preventing the unwanted fast adhesion between the opposite portions of the inner surface of the tubular laminate, any substance may be adopted insofar as it is nonpoisonous and resistant to heat. Examples of suitable agents include propylene glycol. glycerin and various vegetable oils.

By the method described above, there can easily be manufactured a film having a coefficient of thermal shrinkage of not less than 25% at 85° C. and not less than 45% at 95° C.

The five-layer stretched tubular film obtained by the present invention is shrinkable and excels in oil resistance, cold resistance, preservability and sealing upon clipping and, therefore, is advantageously used for packaging fatty foodstuffs, particularly those of irregular shape. Usually, the tubular film is cut to a desired length, heat sealed on one open end, packed with a given article, and clipped on the remaining open end by means of a wire clip. Because of its outstanding sealing property, the remaining open end of the tubular film may also be tightly closed by heat sealing. Alternatively, the tubular film may be sealed at a freely selected position and cut at a other suitable position to produce a bag having an open mouth, which may be tightly closed afterward by clipping or heat sealing. Thus, various uses are found for the tubular film.

In the working examples which follow, the polymers indicated below were used. Whenever there are mentioned parts and percents, they are meant as parts by weight and percents by weight.

(1) Olefin homopolymers and olefin copolymers

| Symbol | Kind of polymer* | Melt index (dg/min.) | Density (g/cc) | Percent weight of monomer | Crystal-melting point (°C.) |
|---|---|---|---|---|---|
| A | LDPE | 0.8 | 0.925 | — | 108 |
| B | LDPE | 6.5 | 0.917 | — | 100 |
| C | Et-VA | 3 | 0.92 | VA 5 | 97 |
| D | Et-VA | 6 | 0.93 | VA10 | 88 |
| E | Et-VA | 3 | 0.93 | VA15 | 84 |
| F | Et-VA | 3 | 0.95 | VA25 | 70 |
| G | Et-EA | 6 | 0.93 | EA18 | 89 |
| H | Et-VA-AA | 5 | 0.95 | VA28 AA 2 | 64 |

*LDPE stands for low-density polyethylene, Et-VA-AA for ethylene-vinyl acetate copolymer having acrylic acid grafted thereto, and Et-EA for ethylene-ethyl acrylate.

(2) Ionomer resins

| Symbol | Melt index (dg/min.) | Kind of polymer | Ionization | Crystal-melting point (°C.) |
|---|---|---|---|---|
| J | 0.9 | Ethylene/methacrylic acid copolymer | Conversion of methacrylic acid to Na salt | 88 |
| K | 1.2 | " | " | 96 |
| L | 2.8 | " | " | 88 |

(3) VDC resins

| Symbol | | |
|---|---|---|
| M | Vinylidene chloride/vinyl chloride = | 70/30 (copolymer) 100 parts |
| | Epoxydized soybean oil | 1 part |
| N | Vinylidene chloride/vinyl chloride = | 80/20 (copolymer) 100 parts |
| | Epoxydized soybean oil | 1 part |
| | Dioctyl adipate | 0.4 part |

In the working examples described herein below, the innermost resin layer which was exposed to direct contact with foodstuff was designated as "the fifth layer" and the remaining resin layers were designated as "the fourth, third, . . . layers" in the order of their succession (The outermost layer, therefore, was designated as "the first layer.").

EXAMPLE 1

The film was composed of the following materials.
Fifth layer—Ionomer resin—(K)
Fourth layer—Ethylene copolymer—(E)
Third layer—VDC resin—(M)
Second layer—Ethylene copolymer—(E)
First layer—Olefin homopolymer or olefin copolymer—(B)

These materials were processed by the method illustrated in FIG. 1 and FIG. 2 to produce a biaxially stretched multilayer film. In this case, the first and second layers were united and the third and second layers were similarly united within the annular die 12 and the five layers were laminated within the die and extruded all together. At the die lip, the resin temperature of the tubular laminate 13 was 170° C. The tubular laminate 13 was cooled in a cooling tank 16 kept at 15° C. and was consequently converted into a tubular laminate 17 having a flattened width of 130 mm and a thickness of about 615μ. (Inside the tubular laminate 13 which was held in the cooling tank 16, soybean oil 14 was placed to a level substantially the same as that of the water bath.)

Then, the tubular laminate 17 was conveyed through a hot water tank 18 containing hot water at 93° C. at a feed rate of 5 m/min so as to be heated for about 12 seconds, and then passed through the first nip rollers 19 operated at a rotation speed of 5 m/min. The heated tubular laminate was cooled in the atmosphere at room temperature and passed through the second nip rollers 22 operated at a rotation speed of 16.5 m/min. While it was thus cooled and passed between the two pairs of nip rollers, the tubular laminate was stretched in the longitudinal direction to 3.3 times the original size and, at the same time, inflated in the lateral direction to 3.1 times the original diameter of the tubular laminate 17 with air continuously introduced into the tubular laminate interior. The biaxially stretched five-layer laminate film 21 thus obtained had a flattened width of 400 mm and a thickness of 60μ. The thickness of the fifth layer was 35μ, that of the fourth layer 0.7μ, that of the third layer 8μ, that of the second layer 0.7μ and that of the first layer 15μ, respectively. Then, the tubular film 21 was cut into pieces 800 mm length and each tubular piece had one open end heat sealed to produce a bag. The conditions for the heat sealing were 170° C. seal bar temperature and 0.8 second of sealing time.

The film or bag obtained in Example 1 was tested for physical properties as indicated in Table 1. Examples 2 through 9 were carried out in the same way as Example 1, except using the combinations of materials, layer thicknesses and temperatures of stretching indicated in Table 2. For the purpose of comparison, Comparison Examples 1 through 7 were similarly carried out to produce films of descriptions as indicated in Table 2. The films obtained in Examples 2 through 9 and Comparison Examples 1 through 7 were also tested for physical properties as in Example 1. The results of the tests are shown in Table 3. The VDC resin samples taken from the tubular laminate 17 and the stretched film 21 which were obtained in the process of Example 1 were measured for specific gravity at 30° C. The values were both 1.63. When the VDC resin sample taken from the stretched film 23 five hours after the stretching treatment was measured for specific gravity at 30° C., the value was 1.69, indicating that crystallization of the VDC resin layer proceeded after the stretching treatment.

The product of Example 1 had a suitable interlayer thickness distribution for the flattened bag width of 400 mm which is most widely used in packages used for wrapping raw beef, etc. and that of Example 2 had an interlayer thickness distribution suitable for packages used for wrapping relatively light articles, with the flattened bag width generally ranging from 150 to 250 mm. Contrary to that of Example 2, the product of Example 3 was usable as a bag of a large width suitable for packages of heavy articles, with the flattened bag width falling in the neighborhood of 650 mm, for example. For the convenience of measurement of physical properties, the films produced in these examples were all produced with a fixed flattened bag width of 400 mm. All these products were found to fulfil completely the objects of this invention similarly to the product of Example 1.

In Example 8, the component layers of the film were identical with those of the film of Example 1, except for the first layer which was formed by blending LDPE with Et-VA resin, with the vinyl acetate content at 1.5%. The product of this example had both oil resistance and heat resistance within tolerable ranges and could be used safely and satisfactorily even in the presence of fats in the ordinary shrinking treatment performed on fatty foodstuffs of irregular shape as primarily aimed at by the present invention.

Example 9 represents a case wherein the first layer of the laminate film was formed of the ionomer resin. In the stretching, with the hot water tank kept at 84° C., the laminate exhibited excellent stretch stability and outstanding oil resistance. It had a transparent, glossy appearance.

Comparison Examples 1 and 2 represent cases in which the third layers had thicknesses both deviating from the fixed ranges, and Comparison Example 3 represents a case wherein the fifth layer was given a thickness smaller than the lower limit of the fixed range of this invention. As shown in Table 3, all the products of these examples were found to have some shortcomings.

Comparison Example 7 represents a case in which the innermost layer was formed of the Et-VA resin deficient in oil resistance. The film was found to exhibit absolutely no resistance to the actions of heat at 95° C. and oil.

Examples 4, 5, 6, 7 and 8 represent cases in which the component layers of the films were identical with those of the film of Example 1, except for the second and fourth layers which were made of varying materials. The products of these examples exhibited properties comparable with those of the product of Example 1. The data on the adhesive strength obtained for the products of Comparison Examples 4, 5 and 6 are shown in Table 4 for the purpose of comparison with the data similarly obtained for the products of Examples 4, 5, 6 and 9. The adhesive strength was invariably measured at the interface between the fifth and fourth layers. This measurement was performed in the atmosphere at 23° C. by means of 180° C. peel test (with the rate of drawing fixed at 200 mm/min.).

Table 1

| Item of measurement | Method of measurement |
|---|---|
| Coefficient of shrinkage in hot water | Twenty pieces of film cut to a fixed size of 10 cm × 10 cm were left to stand in a hot water bath at 95° C. for three seconds to be shrunk in their free state. After the standing, they were measured in longitudinal and lateral directions. The measurements were compared with the original measurements (10 cm × 10 cm), with the differences used for calculation of ratios of shrinkage. The shrinkage of a given film was indicated with the smallest and largest values so calculated. |
| Clipping property | By use of a clipping machine and a metal clip (Type Z411) both made by Reem Corp. of the |

Table 1-continued

| Item of measurement | Method of measurement |
|---|---|
| | U.S., about 300 parts of raw beef was vacuum packaged. The packages were subjected to a shrinking treatment at 95° C. for three seconds and left to stand at 0 ± 2° C. for 14 days. After the standing, the packages were tested for loss of vacuum. The clipping property was rated by the frequency of the occurrence of such loss of vacuum. |
| Cold resistance | Bags of film having a flattened bag width of 400 mm and a length of 800 mm were filled each with about 5 kg of raw beef (round) and vacuum packaged by means of clipping. They were subjected to a shrinking treatment at 95° C. for three seconds, cooled at 0 ± 2° C. and dropped repeatedly onto a rigid vinyl chloride board 20 mm in thickness from a height of 1.5 m in a room kept at 0 ± 2° C., with the number of drops counted, until the film sustained rupture such as by formation of pinholes. The counts taken for total of 20 sample bags were averaged and reported as the cold resisting property. |
| Gas impermeability | The amount of oxygen which permeated through a sample film was measured at 30° C. and 100% of RH and as reported as the gas-barrier property. |
| Sealing strength | In bags of film having a flattened bag width of 400 mm and a length of 800 mm, bacon slabs cut to a width of about 5 cm, a width of about 30 cm and a length of 50 cm were placed in such a manner that the bacon slabs are packed closely to the sealed portion of the bags. The packages thus produced were evacuated in a vacuum chamber and, at the same time, heat sealed on their open ends. (The packaging machine used was Type AG-8 made by MultiPak of West Germany). Then, the vacuum packaged bacon slabs were immersed in a hot water bath until the sealed portion of the bag or the sealed end formed by the packaging machine sustained rupture. The interval between the time the samples were immersed in the bath and the time they sustained the rupture was measured. A total of ten measured intervals were averaged and reported as the sealing strength. |
| Oil resistance and heat resistance | Similar to the measurement of sealing strength, vacuum packaged bacon slabs were used. A small amount of oil was intentionally left to float on the surface of a hot water bath kept at temperatures in the range of from 80° C. to 95° C. The packages were immersed in the hot water bath for three seconds and then left to cool off. The packages were examined to rate the oil resistance of the outermost layer of the film and to detect any injury; sustained on the film where bacon slabs had indentations Then, the bacon slabs were removed from the packages and the innermost layer of film was inspected for oil resistance. |

Table 2

| | Combination of layers (the value in parentheses indicating layer thickness) | | | | | Temperature of hot water bath 18 (°C.) |
|---|---|---|---|---|---|---|
| | Fifth layer | Fourth layer | Third layer | Second layer | First layer | |
| 2 | K(28) | E(0.5) | M(7) | E(0.5) | B(13) | 93 |
| Example 3 | K(40) | E(1.0) | M(10) | E(1.0) | B(20) | 93 |
| Example 4 | K(35) | D(0.7) | M(8) | D(0.7) | B(15) | 93 |
| Example 5 | K(35) | F(0.7) | M(8) | F(0.7) | B(15) | 93 |
| Example 6 | K(35) | G(0.7) | M(8) | G(0.7) | B(15) | 93 |
| Example 7 | K(35) | H(0.7) | M(8) | H(0.7) | B(15) | 93 |
| Example 8 | K(35) | E(0.7) | N(6) | E(0.7) | A70% (15) C30% | 93 |

Table 2-continued

| | Combination of layers (the value in parentheses indicating layer thickness) | | | | | Temperature of hot water bath 18 (°C.) |
|---|---|---|---|---|---|---|
| | Fifth layer | Fourth layer | Third layer | Second layer | First layer | |
| Example 9 | J(35) | F(0.7) | M(8) | F(0.7) | L(15) | 84 |
| Comparison Example 1 | K(35) | E(0.7) | M(3) | E(0.7) | B(15) | 93 |
| Comparison Example 2 | K(35) | E(0.7) | M(20) | E(0.7) | B(15) | 93 |
| Comparison Example 3 | K(15) | E(0.7) | M(8) | E(0.7) | B(15) | 93 |
| Comparison Example 4 | K(35) | C(0.7) | M(8) | C(0.7) | B(15) | 93 |
| Comparison Example 5 | J(35) | E(0.7) | M(8) | E(0.7) | L(15) | 84 |
| Comparison Example 6 | J(35) | D(0.7) | M(8) | D(0.7) | L(15) | 84 |
| Comparison Example 7 | D(35) | E(0.7) | M(8) | E(0.7) | J(18) | 84 |

Table 3

| Item Unit | Shrinkage % | Clipping property % | Cold resistance The number of times | Gas impermeability cc/m². day.atm. | Sealing Strength Seconds | Oil resistance and heat resistance* Surface for inspection | | |
|---|---|---|---|---|---|---|---|---|
| | | | | | | Innermost layer | Outermost layer | Hollow |
| Example 1 | 53~57 | <2 | >30 | 60 | >30 | G | G | G |
| Example 2 | 52~55 | <2 | >30 | 69 | 28 | G | G | G |
| Example 3 | 52~58 | <3 | >30 | 48 | >30 | G | G | G |
| Example 4 | 52~57 | <2 | >30 | 60 | >30 | G | G | G |
| Example 5 | 54~57 | <2 | >30 | 62 | >30 | G | G | G |
| Example 6 | 52~58 | <2 | >30 | 61 | >30 | G | G | G |
| Example 7 | 53~57 | <2 | >30 | 59 | >30 | G | G | G |
| Example 8 | 52~57 | <2 | >30 | 56 | >30 | G | G | G |
| Example 9 | 55~59 | <3 | >30 | 62 | >30 | G | G | G |
| Comparison Example 1 | 57~63 | <2 | >30 | 160 | 21 | G | G | F |
| Comparison Example 2 | 42~45 | 9 | 12 | 27 | >30 | G | G | G |
| Comparison Example 3 | 46~49 | 5 | 15 | 59 | 12 | G | G | F |
| Comparison Example 7 | 46~56 | — | — | 61 | 1.5 | B | G | B |

Criteria for evaluation of oil resistance and heat resistance:
G: Absence of discernible degradation
F: Rupture observed partly
B: Rupture observed all over Table 4

| Temperature of hot water tank for stretching | | Material of adhesive layer (fourth layer) | | | |
|---|---|---|---|---|---|
| | | C | D | E | F |
| | | Comparison Example 4 | Example 4 | Example 1 | Example 5 |
| 93° C. | Difference from stretching temperature * | −4 | 5 | 9 | 23 |
| | Degradation of adhesive strength ** | <1% | 5~6.5% | 12~14% | 10~12% |
| | Adhesive strength (g/cm of width) | <5 | 30~40 | 70~80 | 50~60 |
| | | — | Comparison Example 6 | Comparison Example 5 | Example 9 |
| | Difference from stretching temperature * | — | −4 | 0 | 14 |
| | Degradation | | | | |

Table 4-continued

| Temperature of hot water tank for stretching | | Material of adhesive layer (fourth layer) | | | |
| --- | --- | --- | --- | --- | --- |
| | | C | D | E | F |
| 84° C. | of adhesive strength ** | — | <1.8% | <2.7 | 10% |
| | Adhesive strength (g/cm of width) | — | 7~10 | 10~15 | 50 |

*Stretching temperature (°C.) - crystal-melting point of fourth layer (°C.)

** $\frac{\text{Adhesive strength of stretched film}}{\text{Adhesive strength before stretching}} \times 100$

What is claimed is:

1. A biaxially stretched five-layer laminate film comprising:
a first layer of an ionomer, an olefin homopolymer, an olefin copolymer or mixture of an olefin homopolymer with an olefin copolymer and having a thickness in the range of from 7 to 25μ; a fifth layer of an ionomer and having a thickness in the range of from 20 to 50μ; a second layer of an ethylene copolymer with a crystal-melting temperature 5° to 30° C. lower than that of the ionomer of said first or the ionomer of the fifth layer and having a thickness in the range of from 0.2 to 3μ; a third layer of a vinylidene chloride copolymer and having a thickness in the range of from 5 to 15μ; and a fourth layer of an ethylene copolymer with a crystal-melting point 5° to 30° C. lower than that of the ionomer of said first or fifth layer and having a thickness in the range of from 0.2 to 3μ, the ratio of the thickness of said first layer to that of the fifth layer being in the range of from 0.4 to 0.6 and the total thickness of the film being in the range of from 35 to 90μ.

2. The biaxially stretched five-layer laminate film according to claim 1, wherein said first layer is an ethylene homopolymer.

3. The biaxially stretched five-layer laminate film according to claim 1, wherein said first layer is an ethylene-propylene copolymer having an ethylene content of not less than 96% by weight, an ethylene-acrylic ester copolymer having an ethylene content of not less than 96% by weight or an ethylene-vinyl acetate copolymer having an ethylene content of not less than 96% by weight.

4. The biaxially stretched five-layer laminate film according to claim 1, wherein said first layer is a mixture of an olefin homopolymer with an olefin copolymer formed by blending an ethylene homopolymer having a density of not more than 0.925 g/cm$^3$ with an ethylene-vinyl acetate copolymer, an ethylene-acrylic ester copolymer or an ethylene-propylene copolymer and which has an ethylene homopolymer content of not less than 92% by weight.

5. The biaxially stretched five-layer laminate film according to claim 1, wherein the crystal-melting point of said first layer resin is at least 4° C. higher than the crystal-melting point of the second and fourth layer resin and no more than 15° C. higher than that of the fifth layer resin.

6. The biaxially stretched five-layer laminate film according to claim 1, wherein said second and fourth layers are of an ethylene-vinyl acetate copolymer having an ethylene content of from 70 to 92% by weight and a melt index in the range of from 2 to 10; a partially saponified ethylene-vinyl acetate copolymer; a product of grafting of said ethylene-vinyl acetate copolymer and/or partially saponified copolymer with a polar monomer such as acrylic acid, methacrylic acid, maleic acid, maleic anhydride or vinyl chloride; a two-component copolymer of ethylene with an acrylic ester or methacrylic ester; or a three-component copolymer of ethylene with one of said esters and vinyl acetate.

7. The biaxially stretched five-layer laminate film according to claim 1, wherein said vinylidene chloride copolymer is a copolymer consisting of from 65 to 95% by weight of vinylidene chloride and from 5 to 35% by weight of at least one unsaturated monomer copolymerizable with said vinylidene chloride.

8. The biaxially stretched five-layer laminate film according to claim 1, wherein said unsaturated monomer is vinyl chloride, acrylonitrile or an alkyl acrylic ester having an alkyl group of from 1 to 18 carbon atoms.

* * * * *